E. H. Philo,
Cider Mill.
Nº 27,650.  Patented Mar. 27, 1860.
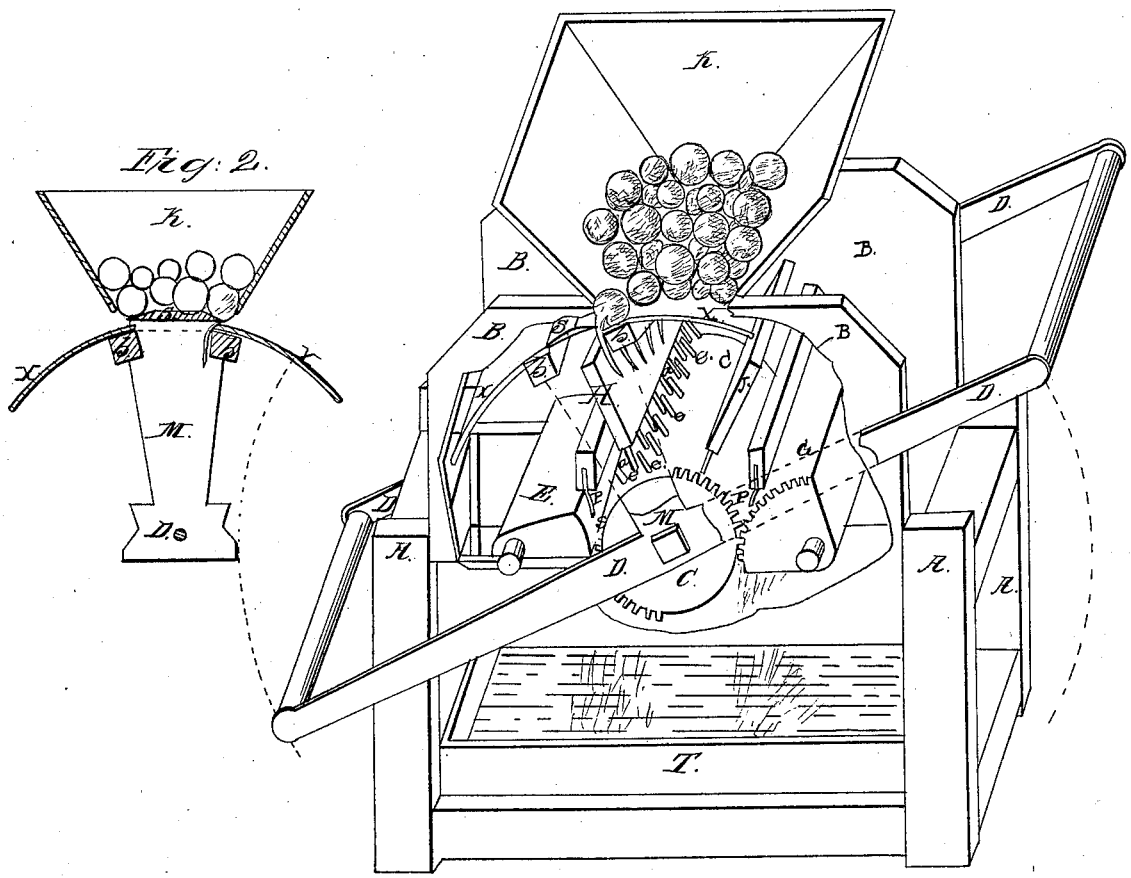
Witnesses:
Inventor:
E H Philo

UNITED STATES PATENT OFFICE.

E. H. PHILO, OF HALFMOON, NEW YORK, ASSIGNOR TO CHAS. E. PEASE, OF ALBANY, NEW YORK.

CIDER-MILL.

Specification of Letters Patent No. 27,650, dated March 27, 1860.

*To all whom it may concern:*

Be it known that I, ELISHA H. PHILO, of the town of Halfmoon, State of New York, have invented a new Method of Constructing Cider-Mills; and I declare the following specification, with the drawings annexed hereto as part of the same, to be a full and perfect description thereof.

Figure 1 represents in perspective my machine, A A being a strong rectangular frame, B, B, vertical parallel sides resting upon the frame and inclosing the machinery, a portion of the hither side being represented as removed, to show the apparatus which consists of a cylinder C librating upon its axes in boxes fixed upon the top of the frame A and operated by the levers D, D, attached to the extremities of its axes. Two quadrants of cylinders E and G lie parallel with C upon axes also resting in boxes upon the top of the frame, their cylindrical surfaces being adjusted to lie very near the surface of C. These quadrants are geared with C by cog-teeth along their edges, meshing into corresponding teeth attached to the edges of C. Above the cylinder C are placed two partitions H and J extending hopper-wise between the sides B, B, from near the top of those sides, to within a short distance from the surface of C. The bottoms of H and J are furnished with iron spikes or teeth $a, a$, placed at short intervals and just grazing the surface of C, upon whose surface are placed similar spikes $e, e$, arranged as shown in the drawing, in double ranks, so that when the cylinder has attained its extreme libration either way, one range may occupy the intervals between the spikes of E or J, while the other lies outside of them. Above the sides B, B, is placed the hopper K to hold the apples to be ground.

Between the hopper and the sub-hopper formed by H and J, there is arranged a slicing apparatus constructed as follows, as shown separately in Fig. 2 which is a vertical sectional diagram thereof.

M are arms projecting upward at right angles from levers D at their centers. Upon their upper ends and just under the hopper K they support two cross pieces whose ends are seen at $b\ b$. Extending above these for their whole length, and between them and the hopper is placed a slicing knife $k$ whose end and cross section is shown at S. From the upper surfaces of $b, b$, extends each way an arched apron, (whose curve is that described by the upper surfaces as they librate with the arms D, D,) the object of this apron being to act as a bottom to the hopper while the knife is sweeping back and forth. The knife as shown in profile section, Fig. 2, is arranged to cut like a plane-iron and from both of its edges, the slicings passing between the knife edge and the cross pieces $b, b$.

The apples being placed in the hopper K, and the levers D, D, moved up and down, the slicer cuts them into strips which passing down between H and J upon C, are swept by its teeth right and left, through the teeth $a, a$, where they are torn into small shreds, which falling down between the roller C and the quadrants G, are thoroughly squeezed and pass down in juice and thin pumice into the trough T fixed upon the bottom of the frame.

In order to keep the quadrants clean from the pumice, and prevent its working backward over them, scrapers P, P, are attached to cross pieces affixed to the sides B, B, and lie close to the surface of the quadrants, so as effectually to scrape off everything that should rise up from between C and G.

What I claim and desire to secure by Letters Patent is—

1. Cylinder C operating with a librating movement in connection with quadrants E and G and with its teeth arranged to coöperate with teeth $a, a$, affixed to partitions H and J, substantially as described and for the purposes set forth.

2. The slicing apparatus S operating as set forth in combination with the cylinder C and its coöperative apparatus as described in the above specification.

E. H. PHILO.

Witnesses:
A. N. DE WITT,
RUE VARUK DE WITT.